US008707414B2

(12) United States Patent
Roy et al.

(10) Patent No.: US 8,707,414 B2
(45) Date of Patent: Apr. 22, 2014

(54) SYSTEMS AND METHODS FOR LOCATION AWARE ACCESS CONTROL MANAGEMENT

(75) Inventors: Sanjay Roy, Sydney (AU); Muneswar Rao Gali, Bangalore (IN); Neelendra Bhandari, Barmer (IN); Gopi Chappidi, Sydney (AU); Chandrakantha Reddy, Andhra Pradesh (IN)

(73) Assignee: Honeywell International Inc., Morristown, NJ (US)

( * ) Notice: Subject to any disclaimer, the term of this patent is extended or adjusted under 35 U.S.C. 154(b) by 434 days.

(21) Appl. No.: 12/986,096

(22) Filed: Jan. 6, 2011

(65) Prior Publication Data

US 2011/0167488 A1   Jul. 7, 2011

(30) Foreign Application Priority Data

Jan. 7, 2010   (AU) ................................ 2010900052

(51) Int. Cl.
*G06F 7/04* (2006.01)
*G06F 15/16* (2006.01)
*G06F 17/30* (2006.01)
*H04L 29/06* (2006.01)

(52) U.S. Cl.
USPC ............................................................. 726/9

(58) Field of Classification Search
None
See application file for complete search history.

(56) References Cited

U.S. PATENT DOCUMENTS

| | | |
|---|---|---|
| 3,753,232 A | 8/1973 | Sporer |
| 3,806,911 A | 4/1974 | Pripusich |
| 3,857,018 A | 12/1974 | Stark et al. |
| 3,860,911 A | 1/1975 | Hinman et al. |
| 3,866,173 A | 2/1975 | Moorman et al. |
| 3,906,447 A | 9/1975 | Crafton |
| 4,095,739 A | 6/1978 | Fox et al. |
| 4,146,085 A | 3/1979 | Wills |
| 4,148,012 A | 4/1979 | Baump et al. |
| 4,161,778 A | 7/1979 | Getson, Jr. et al. |
| 4,213,118 A | 7/1980 | Genest et al. |
| 4,283,710 A | 8/1981 | Genest et al. |
| 4,298,946 A | 11/1981 | Hartsell et al. |
| 4,332,852 A | 6/1982 | Korklan et al. |
| 4,336,902 A | 6/1982 | Neal |
| 4,337,893 A | 7/1982 | Flanders et al. |

(Continued)

FOREIGN PATENT DOCUMENTS

| | | |
|---|---|---|
| CA | 2240881 | 12/1999 |
| CN | 1265762 A | 9/2000 |

(Continued)

OTHER PUBLICATIONS

"Keyfast Technical Overview," Corestreet Ltd., 21 pages, 2004.
U.S. Appl. No. 13/533,334, filed Jun. 26, 2012.
"Certificate Validation Choices," CoreStreet, Inc., 8 pages, 2002.
"CoreStreet Cuts the PKI Gordian Knot," Digital ID World, pp. 22-25, Jun./Jul. 2004.

(Continued)

*Primary Examiner* — Nadia Khoshnoodi
(74) *Attorney, Agent, or Firm* — Seager Tufte & Wickhem LLC (57) ABSTRACT

Described herein are systems and methods for access control management, these generally being directed towards location aware access control management. Embodiments of the invention have been particularly developed for providing additional functionalities in access control systems having disconnected devices, and the present disclosure is primarily focused accordingly. For example, embodiments include access control devices configured to operate in conjunction with a GPS receiver or other source of geographical positional information, and methods associated with the use of such devices.

11 Claims, 6 Drawing Sheets

(56) References Cited

U.S. PATENT DOCUMENTS

| | | |
|---|---|---|
| 4,353,064 A | 10/1982 | Stamm |
| 4,373,664 A | 2/1983 | Barker et al. |
| 4,379,483 A | 4/1983 | Farley |
| 4,462,028 A | 7/1984 | Ryan et al. |
| 4,525,777 A | 6/1985 | Webster et al. |
| 4,538,056 A | 8/1985 | Young et al. |
| 4,556,169 A | 12/1985 | Zervos |
| 4,628,201 A | 12/1986 | Schmitt |
| 4,646,964 A | 3/1987 | Parker et al. |
| 4,685,615 A | 8/1987 | Hart |
| 4,821,177 A | 4/1989 | Koegel et al. |
| 4,847,839 A | 7/1989 | Hudson, Jr. et al. |
| 5,070,468 A | 12/1991 | Niinomi et al. |
| 5,071,065 A | 12/1991 | Aalto et al. |
| 5,099,420 A | 3/1992 | Barlow et al. |
| 5,172,565 A | 12/1992 | Wruck et al. |
| 5,204,663 A | 4/1993 | Lee |
| 5,227,122 A | 7/1993 | Scarola et al. |
| 5,259,553 A | 11/1993 | Shyu |
| 5,271,453 A | 12/1993 | Yoshida et al. |
| 5,361,982 A | 11/1994 | Liebl et al. |
| 5,404,934 A | 4/1995 | Carlson et al. |
| 5,420,927 A | 5/1995 | Micali |
| 5,449,112 A | 9/1995 | Heitman et al. |
| 5,465,082 A | 11/1995 | Chaco |
| 5,479,154 A | 12/1995 | Wolfram |
| 5,481,481 A | 1/1996 | Frey et al. |
| 5,526,871 A | 6/1996 | Musser et al. |
| 5,541,585 A | 7/1996 | Duhame et al. |
| 5,591,950 A | 1/1997 | Imedio-Ocana |
| 5,604,804 A | 2/1997 | Micali |
| 5,610,982 A | 3/1997 | Micali |
| 5,631,825 A | 5/1997 | van Weele et al. |
| 5,640,151 A | 6/1997 | Reis et al. |
| 5,644,302 A | 7/1997 | Hana et al. |
| 5,663,957 A | 9/1997 | Dent |
| 5,666,416 A | 9/1997 | Micali |
| 5,717,757 A | 2/1998 | Micali |
| 5,717,758 A | 2/1998 | Micall |
| 5,717,759 A | 2/1998 | Micali |
| 5,732,691 A | 3/1998 | Maiello et al. |
| 5,778,256 A | 7/1998 | Darbee |
| 5,793,868 A | 8/1998 | Micali |
| 5,914,875 A | 6/1999 | Monta et al. |
| 5,915,473 A | 6/1999 | Ganesh et al. |
| 5,927,398 A | 7/1999 | Maciulewicz |
| 5,930,773 A | 7/1999 | Crooks et al. |
| 5,960,083 A | 9/1999 | Micali |
| 5,973,613 A | 10/1999 | Reis et al. |
| 6,072,402 A | 6/2000 | Kniffin et al. |
| 6,097,811 A | 8/2000 | Micali |
| 6,104,963 A | 8/2000 | Cebasek et al. |
| 6,119,125 A | 9/2000 | Gloudeman et al. |
| 6,141,595 A | 10/2000 | Gloudeman et al. |
| 6,149,065 A | 11/2000 | White et al. |
| 6,154,681 A | 11/2000 | Drees et al. |
| 6,167,316 A | 12/2000 | Gloudeman et al. |
| 6,233,954 B1 | 5/2001 | Mehaffey et al. |
| 6,241,156 B1 | 6/2001 | Kline et al. |
| 6,249,755 B1 | 6/2001 | Yemini et al. |
| 6,260,765 B1 | 7/2001 | Natale et al. |
| 6,292,893 B1 | 9/2001 | Micali |
| 6,301,659 B1 | 10/2001 | Micali |
| 6,318,137 B1 | 11/2001 | Chaum |
| 6,324,854 B1 | 12/2001 | Jayanth |
| 6,334,121 B1 | 12/2001 | Primeaux et al. |
| 6,347,374 B1 | 2/2002 | Drake et al. |
| 6,366,558 B1 | 4/2002 | Howes et al. |
| 6,369,719 B1 | 4/2002 | Tracy et al. |
| 6,374,356 B1 | 4/2002 | Daigneault et al. |
| 6,393,848 B2 | 5/2002 | Roh et al. |
| 6,394,359 B1 | 5/2002 | Morgan |
| 6,424,068 B2 | 7/2002 | Nakagishi |
| 6,453,426 B1 | 9/2002 | Gamache et al. |
| 6,453,687 B2 | 9/2002 | Sharood et al. |
| 6,483,697 B1 | 11/2002 | Jenks et al. |
| 6,487,658 B1 | 11/2002 | Micali |
| 6,490,610 B1 | 12/2002 | Rizvi et al. |
| 6,496,575 B1 | 12/2002 | Vasell et al. |
| 6,516,357 B1 | 2/2003 | Hamann et al. |
| 6,518,953 B1 | 2/2003 | Armstrong |
| 6,546,419 B1 | 4/2003 | Humpleman et al. |
| 6,556,899 B1 | 4/2003 | Harvey et al. |
| 6,574,537 B2 | 6/2003 | Kipersztok et al. |
| 6,604,023 B1 | 8/2003 | Brown et al. |
| 6,615,594 B2 | 9/2003 | Jayanth et al. |
| 6,628,997 B1 | 9/2003 | Fox et al. |
| 6,647,317 B2 | 11/2003 | Takai et al. |
| 6,647,400 B1 | 11/2003 | Moran |
| 6,658,373 B2 | 12/2003 | Rossi et al. |
| 6,663,010 B2 | 12/2003 | Chene et al. |
| 6,665,669 B2 | 12/2003 | Han et al. |
| 6,667,690 B2 | 12/2003 | Durej et al. |
| 6,741,915 B2 | 5/2004 | Poth |
| 6,758,051 B2 | 7/2004 | Jayanth et al. |
| 6,766,450 B2 | 7/2004 | Micali |
| 6,789,739 B2 | 9/2004 | Rosen |
| 6,796,494 B1 | 9/2004 | Gonzalo |
| 6,801,849 B2 | 10/2004 | Szukala et al. |
| 6,801,907 B1 | 10/2004 | Zagami |
| 6,826,454 B2 | 11/2004 | Sulfstede |
| 6,851,621 B1 | 2/2005 | Wacker et al. |
| 6,871,193 B1 | 3/2005 | Campbell et al. |
| 6,886,742 B2 | 5/2005 | Stoutenburg et al. |
| 6,895,215 B2 | 5/2005 | Uhlmann |
| 6,910,135 B1 | 6/2005 | Grainger |
| 6,967,612 B1 | 11/2005 | Gorman et al. |
| 6,969,542 B2 | 11/2005 | Klasen-Memmer et al. |
| 6,970,070 B2 | 11/2005 | Juels et al. |
| 6,973,410 B2 | 12/2005 | Seigel |
| 6,983,889 B2 | 1/2006 | Alles |
| 6,989,742 B2 | 1/2006 | Ueno et al. |
| 7,004,401 B2 | 2/2006 | Kallestad |
| 7,019,614 B2 | 3/2006 | Lavelle et al. |
| 7,032,114 B1 | 4/2006 | Moran |
| 7,055,759 B2 | 6/2006 | Wacker et al. |
| 7,124,943 B2 | 10/2006 | Quan et al. |
| 7,130,719 B2 | 10/2006 | Ehlers et al. |
| 7,183,894 B2 | 2/2007 | Yui et al. |
| 7,203,962 B1 | 4/2007 | Moran |
| 7,205,882 B2 | 4/2007 | Libin |
| 7,216,007 B2 | 5/2007 | Johnson |
| 7,216,015 B2 | 5/2007 | Poth |
| 7,218,243 B2 | 5/2007 | Hayes et al. |
| 7,222,800 B2 | 5/2007 | Wruck |
| 7,233,243 B2 | 6/2007 | Roche et al. |
| 7,243,001 B2 | 7/2007 | Janert et al. |
| 7,245,223 B2 | 7/2007 | Trela |
| 7,250,853 B2 | 7/2007 | Flynn |
| 7,274,676 B2 | 9/2007 | Cardei et al. |
| 7,313,819 B2 | 12/2007 | Burnett et al. |
| 7,321,784 B2 | 1/2008 | Serceki et al. |
| 7,337,315 B2 | 2/2008 | Micali |
| 7,343,265 B2 | 3/2008 | Andarawis et al. |
| 7,353,396 B2 | 4/2008 | Micali et al. |
| 7,362,210 B2 | 4/2008 | Bazakos et al. |
| 7,376,839 B2 | 5/2008 | Carta et al. |
| 7,379,997 B2 | 5/2008 | Ehlers et al. |
| 7,380,125 B2 | 5/2008 | Di Luoffo et al. |
| 7,383,158 B2 | 6/2008 | Krocker et al. |
| 7,397,371 B2 | 7/2008 | Martin et al. |
| 7,505,914 B2 | 3/2009 | McCall |
| 7,542,867 B2 | 6/2009 | Steger et al. |
| 7,574,734 B2 | 8/2009 | Fedronic et al. |
| 7,586,398 B2 | 9/2009 | Huang et al. |
| 7,600,679 B2 | 10/2009 | Kshirsagar et al. |
| 7,661,603 B2 | 2/2010 | Yoon et al. |
| 7,735,145 B2 | 6/2010 | Kuehnel et al. |
| 7,794,536 B2 | 9/2010 | Roy et al. |
| 7,818,026 B2 | 10/2010 | Hartikainen et al. |
| 7,853,987 B2 | 12/2010 | Balasubramanian et al. |
| 7,907,753 B2 | 3/2011 | Wilson et al. |
| 7,937,669 B2 | 5/2011 | Zhang et al. |
| 7,983,892 B2 | 7/2011 | Anne et al. |

(56) References Cited

U.S. PATENT DOCUMENTS

| | | | |
|---|---|---|---|
| 7,995,526 | B2 | 8/2011 | Liu et al. |
| 8,045,960 | B2 | 10/2011 | Orakkan |
| 8,095,889 | B2 | 1/2012 | DeBlaey et al. |
| 2002/0011923 | A1 | 1/2002 | Cunningham et al. |
| 2002/0022991 | A1 | 2/2002 | Sharood et al. |
| 2002/0046337 | A1 | 4/2002 | Micali |
| 2002/0118096 | A1 | 8/2002 | Hoyos et al. |
| 2002/0121961 | A1 | 9/2002 | Huff |
| 2002/0165824 | A1 | 11/2002 | Micali |
| 2003/0033230 | A1 | 2/2003 | McCall |
| 2003/0174049 | A1 | 9/2003 | Beigel et al. |
| 2003/0208689 | A1 | 11/2003 | Garza |
| 2003/0233432 | A1 | 12/2003 | Davis et al. |
| 2004/0062421 | A1 | 4/2004 | Jakubowski et al. |
| 2004/0064453 | A1 | 4/2004 | Ruiz et al. |
| 2004/0087362 | A1 | 5/2004 | Beavers |
| 2004/0205350 | A1 | 10/2004 | Waterhouse et al. |
| 2005/0138380 | A1 | 6/2005 | Fedronic et al. |
| 2006/0059557 | A1 | 3/2006 | Markham et al. |
| 2007/0109098 | A1 | 5/2007 | Siemon et al. |
| 2007/0132550 | A1 | 6/2007 | Avraham et al. |
| 2007/0171862 | A1 | 7/2007 | Tang et al. |
| 2007/0268145 | A1 | 11/2007 | Bazakos et al. |
| 2007/0272744 | A1 | 11/2007 | Bantwal et al. |
| 2008/0086758 | A1 | 4/2008 | Chowdhury et al. |
| 2008/0173709 | A1 | 7/2008 | Ghosh |
| 2008/0272881 | A1 | 11/2008 | Goel |
| 2009/0018900 | A1 | 1/2009 | Waldron et al. |
| 2009/0080443 | A1 | 3/2009 | Dziadosz |
| 2009/0086692 | A1 | 4/2009 | Chen |
| 2009/0121830 | A1 | 5/2009 | Dziadosz |
| 2009/0167485 | A1 | 7/2009 | Birchbauer et al. |
| 2009/0168695 | A1 | 7/2009 | Johar et al. |
| 2009/0258643 | A1 | 10/2009 | McGuffin |
| 2009/0266885 | A1 | 10/2009 | Marcinowski et al. |
| 2009/0292524 | A1 | 11/2009 | Anne et al. |
| 2009/0292995 | A1 | 11/2009 | Anne et al. |
| 2009/0292996 | A1 | 11/2009 | Anne et al. |
| 2009/0328152 | A1 | 12/2009 | Thomas et al. |
| 2009/0328203 | A1 | 12/2009 | Haas |
| 2010/0036511 | A1 | 2/2010 | Dongare |
| 2010/0148918 | A1 | 6/2010 | Gerner et al. |
| 2010/0164720 | A1 | 7/2010 | Kore |
| 2010/0269173 | A1 | 10/2010 | Srinivasa et al. |
| 2011/0038278 | A1 | 2/2011 | Bhandari et al. |
| 2011/0071929 | A1 | 3/2011 | Morrison |
| 2011/0112717 | A1* | 5/2011 | Resner .................... 701/33 |
| 2011/0115602 | A1 | 5/2011 | Bhandari et al. |
| 2011/0133884 | A1 | 6/2011 | Kumar et al. |
| 2011/0153791 | A1 | 6/2011 | Jones et al. |
| 2011/0181414 | A1 | 7/2011 | G. et al. |
| 2012/0096131 | A1 | 4/2012 | Bhandari et al. |
| 2012/0106915 | A1 | 5/2012 | Palmer |
| 2012/0121229 | A1 | 5/2012 | Lee |
| 2012/0133482 | A1 | 5/2012 | Bhandari et al. |

FOREIGN PATENT DOCUMENTS

| | | |
|---|---|---|
| DE | 19945861 | 3/2001 |
| EP | 0043270 | 1/1982 |
| EP | 0122244 | 10/1984 |
| EP | 0152678 | 8/1985 |
| EP | 0629940 | 12/1994 |
| EP | 0858702 | 4/2002 |
| EP | 1339028 | 8/2003 |
| EP | 1630639 | 3/2006 |
| GB | 2251266 | 7/1992 |
| GB | 2390705 | 1/2004 |
| JP | 6019911 | 1/1994 |
| JP | 2003/074942 | 3/2003 |
| JP | 2003/240318 | 8/2003 |
| WO | WO 84/02786 | 7/1984 |
| WO | WO 94/19912 | 9/1994 |
| WO | WO 96/27858 | 9/1996 |
| WO | WO 00/11592 | 3/2000 |
| WO | 0076220 A1 | 12/2000 |
| WO | WO 01/42598 | 6/2001 |
| WO | WO 01/57489 | 8/2001 |
| WO | WO 01/60024 | 8/2001 |
| WO | WO 02/32045 | 4/2002 |
| WO | WO 02/091311 | 11/2002 |
| WO | WO 03/090000 | 10/2003 |
| WO | WO 2004/092514 | 10/2004 |
| WO | WO 2005/038727 | 4/2005 |
| WO | WO 2006/021047 | 3/2006 |
| WO | 2006126974 A1 | 11/2006 |
| WO | 2007043798 A1 | 4/2007 |
| WO | WO 2008/045918 | 4/2008 |
| WO | WO 2008/144803 | 12/2008 |
| WO | WO 2010/039598 | 4/2010 |
| WO | WO 2010/106474 | 9/2010 |

OTHER PUBLICATIONS

"Distributed Certificate Validation," CoreStreet, Ltd., 17 pages, 2006.

"Identity Services Infrastructure," CoreStreet Solutions—Whitepaper, 12 pages, 2006.

"Important FIPS 201 Deployment Considerations," Corestreet Ltd.—Whitepaper, 11 pages, 2005.

"Introduction to Validation for Federated PKI," Corestreet Ltd, 20 pages, 2006.

"Manageable Secure Physical Access," Corestreet Ltd, 3 pages, 2002.

"MiniCRL, Corestreet Technology Datasheet," CoreStreet, 1 page, 2006.

"Nonce Sense, Freshness and Security in OCSP Responses," Corestreet Ltd, 2 pages, 2003.

"Real Time Credential Validation, Secure, Efficient Permissions Management," Corestreet Ltd, 5 pages, 2002.

"The Role of Practical Validation for Homeland Security," Corestreet Ltd, 3 pages, 2002.

"The Roles of Authentication, Authorization & Cryptography in Expanding Security Industry Technology," Security Industry Association (SIA), Quarterly Technical Update, 32 pages, Dec. 2005.

"Vulnerability Analysis of Certificate Validation Systems," Corestreet Ltd—Whitepaper, 14 pages, 2006.

U.S. Appl. No. 13/292,992, filed Nov. 9, 2011.

Goldman et al., "Information Modeling for Intrusion Report Aggregation," IEEE, Proceedings DARPA Information Survivability Conference and Exposition II, pp. 329-342, 2001.

Honeywell, "Excel Building Supervisor-Integrated R7044 and FS90 Ver. 2.0," Operator Manual, 70 pages, Apr. 1995.

http://www.tcsbasys.com/products/superstats.asp, TCS/Basys Controls: Where Buildings Connect With Business, 2 pages, printed Aug. 26, 2003.

http://www.tcsbasys.com/products/sz1009.asp, TCS/Basys Controls: Where Buildings Connect With Business, 1 page, printed Aug. 26, 2003.

http://www.tcsbasys.com/products/sz1017a.asp, TCS/Basys Controls: Where Buildings Connect With Business, 1 page, printed Aug. 26, 2003.

http://www.tcsbasys.corn/products/sz1017n.asp, TCS/Basys Controls: Where Buildings Connect With Business, 1 page, printed Aug. 26, 2003.

http://www.tcsbasys.com/products/sz1020nseries.asp, TCS/Basys Controls: Where Buildings Connect With Business, 2 pages, printed Aug. 26, 2003.

http://www.tcsbasys.com/products/sz1020series.asp, TCS/Basys Controls: Where Buildings Connect With Business, 2 pages, printed Aug. 26, 2003.

http://www.tcsbasys.com/products/sz1022.asp, TCS/Basys Controls: Where Buildings Connect With Business, 2 pages, printed Aug. 26, 2003.

http://www.tcsbasys.com/products/sz1024.asp, TCS/Basys Controls: Where Buildings Connect With Business, 2 pages, printed Aug. 26, 2003.

(56) References Cited

OTHER PUBLICATIONS http://www.tcsbasys.com/products/sz1030series.asp, TCS/Basys Controls: Where Buildings Connect With Business, 2 pages, printed Aug. 26, 2003.
http://www.tcsbasys.com/products/sz1033.asp, TCS/Basys Controls: Where Buildings Connect With Business, 2 pages, printed Aug. 26, 2003.
http://www.tcsbasys.com/products/sz1035.asp, TCS/Basys Controls: Where Buildings Connect With Business, 2 pages, printed Aug. 26, 2003.
http://www.tcsbasys.com/products/sz1041.asp, TCS/Basys Controls: Where Buildings Connect With Business, 1 page, printed Aug. 26, 2003.
http://www.tcsbasys.com/products/sz1050series.asp, TCS/Basys Controls: Where Buildings Connect With Business, 2 pages, printed Aug. 26, 2003.
http://www.tcsbasys.com/products/sz1051.asp, TCS/Basys Controls: Where Buildings Connect With Business, 2 pages, printed Aug. 26, 2003.
http://www.tcsbasys.com/products/sz1053.asp, TCS/Basys Controls: Where Buildings Connect With Business, 2 pages, printed Aug. 26, 2003.
http://wwww.tcsbasys.com/products/sz1031.asp, TCS/Basys Controls: Where Buildings Connect With Business, 2 pages, printed Aug. 26, 2003.
Trane, "System Programming, Tracer Summit Version 14, BMTW-SVP01D-EN," 623 pages, 2002.

* cited by examiner

SYSTEMS AND METHODS FOR LOCATION AWARE ACCESS CONTROL MANAGEMENT

The present application is a non-provisional application of Australian Patent Application No. 2010900052, filed Jan. 7, 2010, entitled, "SYSTEMS AND METHODS FOR LOCATION AWARE ACCESS CONTROL MANAGEMENT," which is incorporated herein by reference.

FIELD OF THE INVENTION

The present invention relates to access control, and more particularly to systems and methods for location aware access control management. Embodiments of the invention have been particularly developed for providing additional functionalities in access control environments (that is, access control systems) having both connected and disconnected access control devices, and the present disclosure is primarily focused accordingly. Although the invention is described hereinafter with particular reference to such applications, it will be appreciated that the invention is applicable in broader contexts.

BACKGROUND

Any discussion of the prior art throughout the specification should in no way be considered as an admission that such prior art is widely known or forms part of common general knowledge in the field.

It is known to use a large number of access control devices in an access control environment. It is also known for such an environment to include:
  Connected access control devices, which are connected to a network and communicate with a central administration server over that network.
  Disconnected access control devices, which are not connected to the network. For example, in some cases an access control device, due to its location, cannot be provided with a network connection (either wired or wireless).

The manner in which disconnected access control devices operate in the context of an access control environment creates various challenges. It follows that there is a need in the art for improved systems and methods for access control management.

SUMMARY

It is an object of the present invention to overcome or ameliorate at least one of the disadvantages of the prior art, or to provide a useful alternative.

One embodiment provides an access control device for operation in an access control system including a central server, one or more disconnected access control devices, and one or more connected access control devices, the device including:
  an interface for interacting with an access control token for the purposes of an access transaction;
  a processor and associated memory configured for processing data received from the access control token in relation to the access transaction thereby to selectively allow or deny access; and a receiver for determining geographical positional information for the access transaction.

One embodiment provides a method for operating an access control device, wherein the access control device is part of an access control system including a central server, one or more disconnected access control devices, and one or more connected access control devices, the method including:
  interacting with an access control token for the purposes of an access transaction;
  processing data received from the access control token in relation to the access transaction thereby to selectively allow or deny access; and
  determining, based on data derived by a receiver, geographical positional information for the access transaction.

One embodiment provides an access control system including:
  a central server;
  one or more connected access control devices that are in communication with the central server via a network; and
  one or more disconnected access control devices that are not in communication with the central server via the network, wherein the disconnected devices are configured to propagate information back to the central server by writing data to access control tokens presented by users;
  wherein at least one disconnected access control device includes a receiver for determining geographical positional information and is configured for writing to an access control token data indicative of the geographical positional information associated with an access transaction.

Reference throughout this specification to "one embodiment" or "an embodiment" or "some embodiments" means that a particular feature, structure or characteristic described in connection with the embodiment is included in at least one embodiment of the present invention. Thus, appearances of the phrases "in one embodiment" or "in an embodiment" or "in some embodiments" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

BRIEF DESCRIPTION OF THE DRAWINGS

Embodiments of the invention will now be described, by way of example only, with reference to the accompanying drawings in which.

DETAILED DESCRIPTION

Described herein are systems and methods for access control management, these generally being directed towards location aware access control management. Embodiments of the invention have been particularly developed for providing additional functionalities in access control systems having both connected devices and disconnected devices, and the present disclosure is primarily focused accordingly. For example, embodiments include access control devices configured to operate in conjunction with a GPS receiver or other source of geographical positional information, and methods associated with the use of such devices.

Access Control Environment

Figure 1:
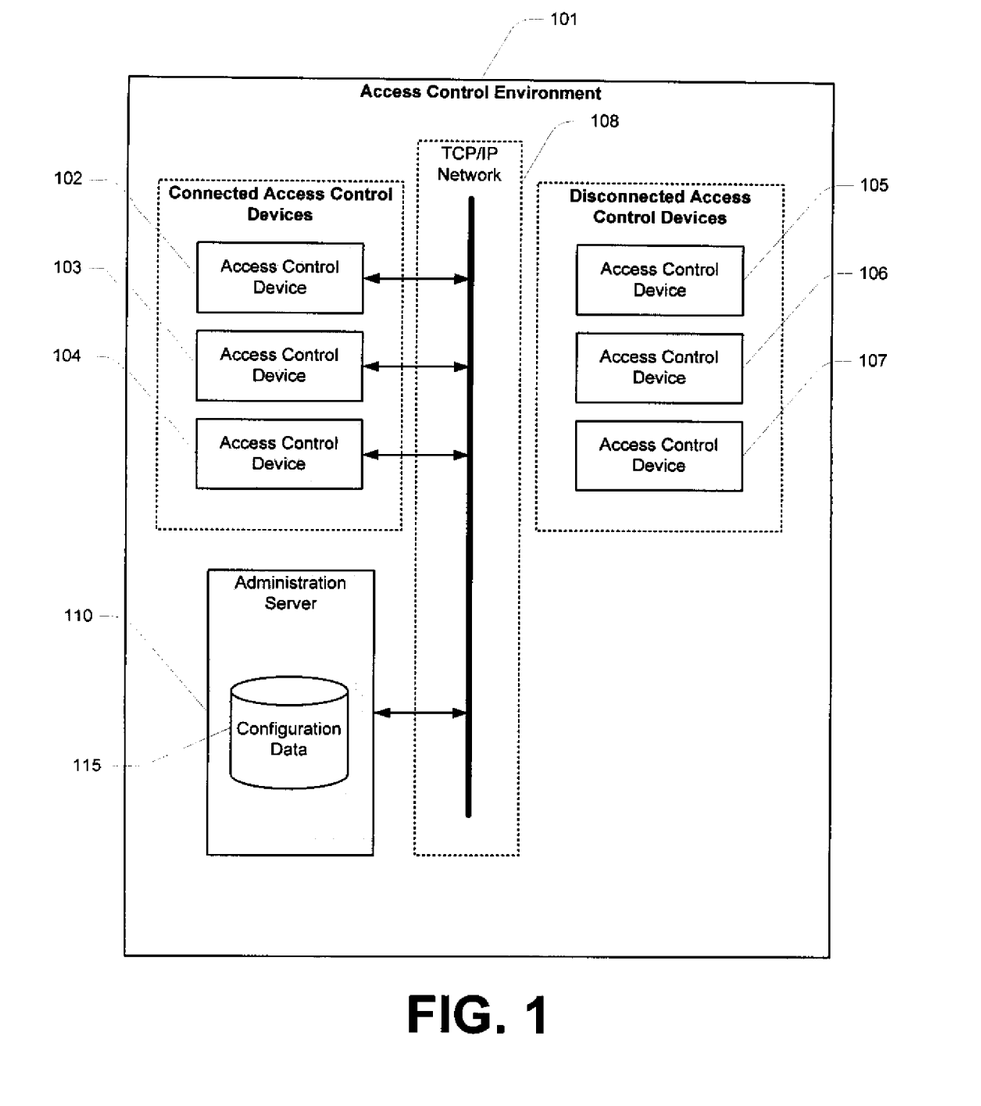
FIG. 1 schematically illustrates an access control environment according to one embodiment.

FIG. 1 schematically illustrates an access control environment 101 according to one embodiment. Environment 101 includes connected access control devices 102 to 104 and disconnected access control devices 105 to 107. The primary point of difference between the connected access control devices and the disconnected access control devices is that the former are connected to a network 108, (such as a TCP/IP or other network) whilst the latter are not. An administration server 110 is also connected to network 108, and the connected access control devices are able to communicate with this administration server over the network. Administration server 110 includes a database 115 for maintaining configuration data.

Although server 110 is schematically illustrated as a single component, in some cases it is defined by a plurality of distributed networked components.

For the sake of the present disclosure, it is assumed that each of access control devices 102 to 107 include similar hardware and software components, and that each device is configured to progress between a connected state and a disconnected state depending on whether or not a connection to network 108 and central administration server 110 is available. However, in other embodiments a variety of different access control devices are used. For example, in some embodiments the access control devices are designed, from a hardware perspective, to allow/deny control to a variety of different locations or functionalities.

In the context of the present disclosure, the term "access control device" refers generally to any device having an "access control" functionality. That is, any device with which a user interacts to gain access to a physical region or virtual functionality. An access control device includes hardware and software components. Common examples include devices that control locking mechanisms on doors or other barriers. However, access control devices are also used for purposes such as activating lighting in a room, controlling access to a vehicle (for example verifying a person is permitted to board a bus), and so on.

In the examples below, particular reference is made to an access control device that is mounted in a vehicle, such as a bus. Such an access control device is configured to operate as a disconnected device in an access control environment (i.e. in an environment that also includes devices that open doors and the like). There is particular mention in the present disclosure of an access control device for operation in an access control system including a central server, one or more disconnected access control devices, and one or more connected access control devices. This compatibility distinguishes an access control device from an alternate form of device (for example a traditional ticket machine located on a bus or the like) in the sense that all devices are configured through a common system for complementary interaction and functionality.

Access Control Device

Figure 2:
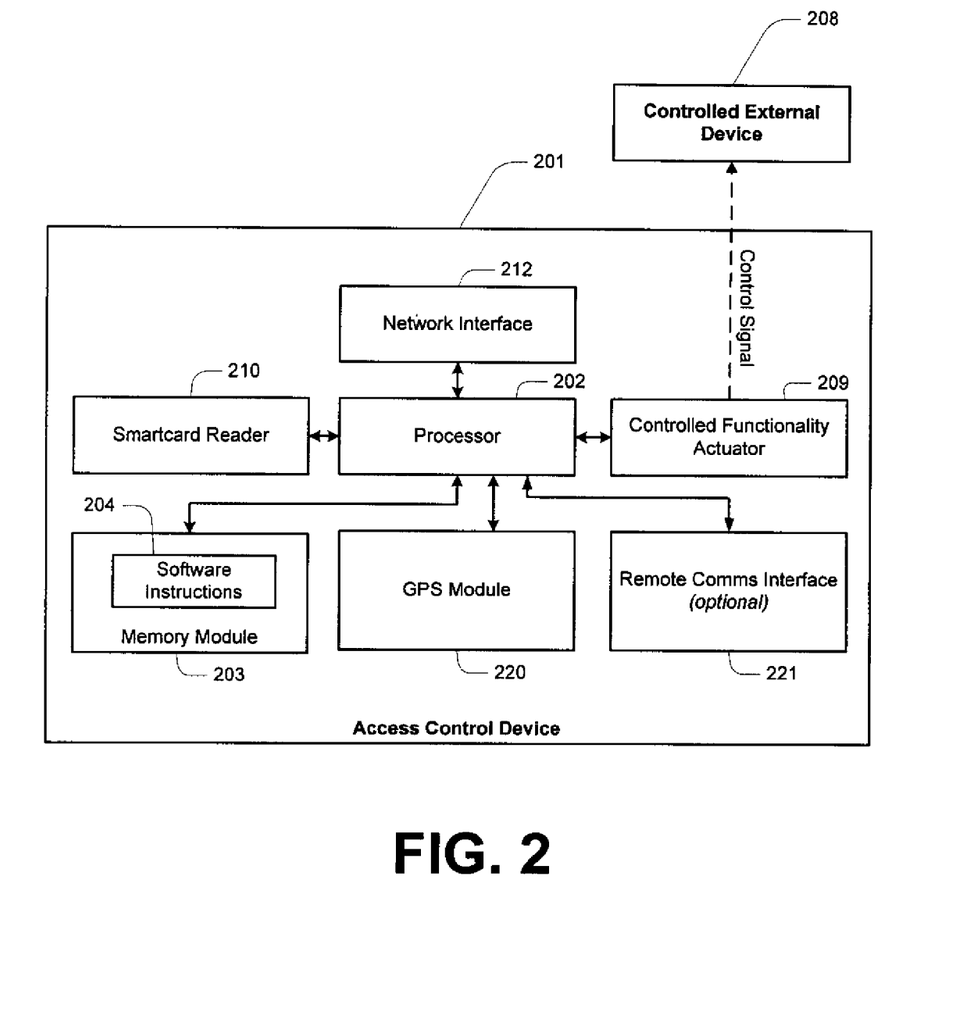
FIG. 2 schematically illustrates an access control device according to one embodiment.

FIG. 2 schematically illustrates an access control device according to one embodiment, in the form of access control device 201. Device 201 is configurable for integration into an access control environment such as environment 101 of FIG. 1. Various components of device 201 are omitted in other embodiments, where the functionality of those components is not required for the purposes of functionality described herein.

Access control device 201 includes a processor 202 coupled to a memory module 203. Memory module 203 carries software instructions 204 which, when executed on processor 202, allow access control device 201 to perform various methods and functionalities described herein.

In the present example, access control device 201 is configured for selectively granting access to a controlled functionality. In particular, processor 201 is coupled to a controlled functionality actuator 209. In the present example actuator 209 is coupled to a controlled external device 208. For example, in one embodiment actuator 209 locks and/or unlocks an external device in the form of a door. In another example the controlled functionality is notional, such as permission to board a bus. In one such example, the controlled functionality actuator provides a tone and/or light to indicate that access is granted.

A user wishing to gain access to the controlled functionality presents an access token to device 201. In the present example, the token takes the form of a smartcard, which is presented to a smartcard reader 210, which is also coupled to processor 201. Upon presentation of the smartcard, processor 201 performs an authorization/authentication process to determine whether or not access should be granted. In the event that the authorization/authentication process is successful, actuator 209 grants access. If the process is unsuccessful, actuator 209 denies access (achieved optionally either by inactivity or positive action).

The process whereby a user presents a smartcard (or other token), and the token is read and data processed, is presently referred to as an access transaction.

The nature of card reader present varies between embodiments depending on the nature of access card that is used in a given access control environment. In the embodiment of FIG. 2, access cards are in the form of smartcards, and reader 210 is a smartcard reader. In further embodiments access codes are used rather than access cards, in which case the reader includes an interface for entering an access code. In some embodiments a combination of these approaches are used. However, smartcards provide advantages in the sense that they include a memory storage allowing an access control device to both read data from the smartcard and write data to the smartcard. Various embodiments of the present invention leverage the ability to write data to smartcards for facilitating integration of disconnected devices in an access control environment.

Access control device 201 is presently configured to operate as a connected access control device or a disconnected access control device, depending on whether a connection to a central administration server is available. To this end, in the present embodiment, device 201 includes a network interface 212 (such as a Ethernet or other wired/wireless network interface) coupled to processor 202 for allowing access control device 201 to communicate over a network (such as network 108 of FIG. 1). In the present embodiment access control device 201 is configured for operation in either a connected state (with connection to the network and administration server) or a disconnected state (without connection to the network and server). In other embodiments device 201 is configured only to operate in a disconnected state, and in such embodiments interface 212 is optionally omitted.

Device 201 includes a receiver 220 for determining geographical positional information. In the present embodiment receiver 220 takes the form of a GPS module, although other components may be used. Module 220 is configured for determining geographical positional information in relation to access transactions that occur. For example, data indicative of positional information is associated with data indicative of an access transaction, thereby to allow subsequent analysis of the access transaction based on the location at which device 201 was located when the transaction occurred. In this manner, the inclusion of receiver 220 allows for location aware access control management. Various functionalities stemming from location awareness are discussed further below.

Device 201 additionally includes, at least in some embodiments, a remote communications interface 221, such as a GSM module (or other cellular communications interface) GPS-based communications interface (for example a GPS-Flight module). This allows device 201 to provide messages to remote devices (for example via SMS or another messaging protocol). Interface 221 is not used to allow connected operation of device 201; even with an operable interface 221 device 201 remains in a disconnected state. Generally speaking, interface 221 is included only in embodiments where its functionality is required, for example in the context of examples discussed further below.

Location Aware Access Transactions

Figure 3:
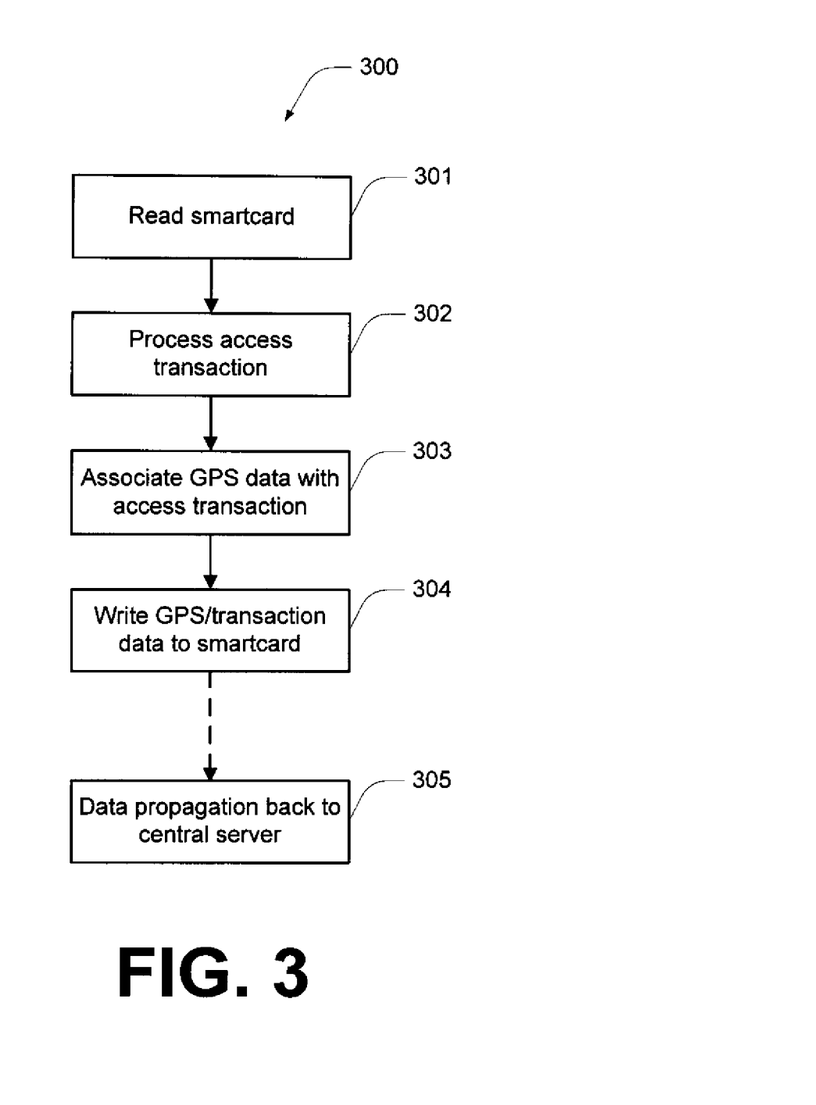
FIG. 3 illustrates a method according to one embodiment.

FIG. 3 illustrates a method 300 according to one embodiment, being a method for performing a location aware access transaction. More specifically, this is a method for operating an access control device, wherein the access control device is part of an access control system including a central server, one or more disconnected access control devices, and one or more connected access control devices. Method 300 is performable by an access control device, such as access control device 201, when that device operates in a disconnected state.

Step 301 includes interacting with an access control token for the purposes of an access transaction. This presently includes reading a smartcard presented to the access control device for the purpose of an access transaction. The access transaction is then processed at step 302, including processing data received from the access control token in relation to the access transaction thereby to selectively allow or deny access to a controlled functionality.

Step 303 includes determining, based on data derived by receiver 220, geographical positional information for the access transaction. This data is then associated with the access transaction. The present method includes writing GPS/transaction data to the smartcard at 304, such that the smartcard carries data indicative of the transaction and the location of device 201 at the time of the transaction. This data is subsequently propagated back to the central server at 305.

In the present embodiment, the data indicative of geographical positional information associated with the access transaction is propagated back to the central server by subsequent interaction between the access control token and a connected access control device of the access control system. That is, a user subsequently presents his/her smartcard to a connected device in the access control environment, and data read from that card is communicated to the central server.

In other embodiments, rather than using smartcard based back-propagation, GPS/transaction data is stored at device 201 until such a time as device 201 is configured for communication with the central server (for example by connecting to a network and operating as a connected access control device). A particular example of this is discussed further below in a section entitled "location aware network connectivity".

Transportation Monitoring

In some embodiments, the data indicative of geographical positional information associated with an access transaction is propagated back to the central server for determining transportation information in respect of a holder of the smartcard. For example, one embodiment makes use of access control devices on employee transportation vehicles for the purposes of monitoring (and optionally monetizing) employee transportation. Exemplary methods directed towards such an embodiment are provided in FIG. 4.

Figure 4:
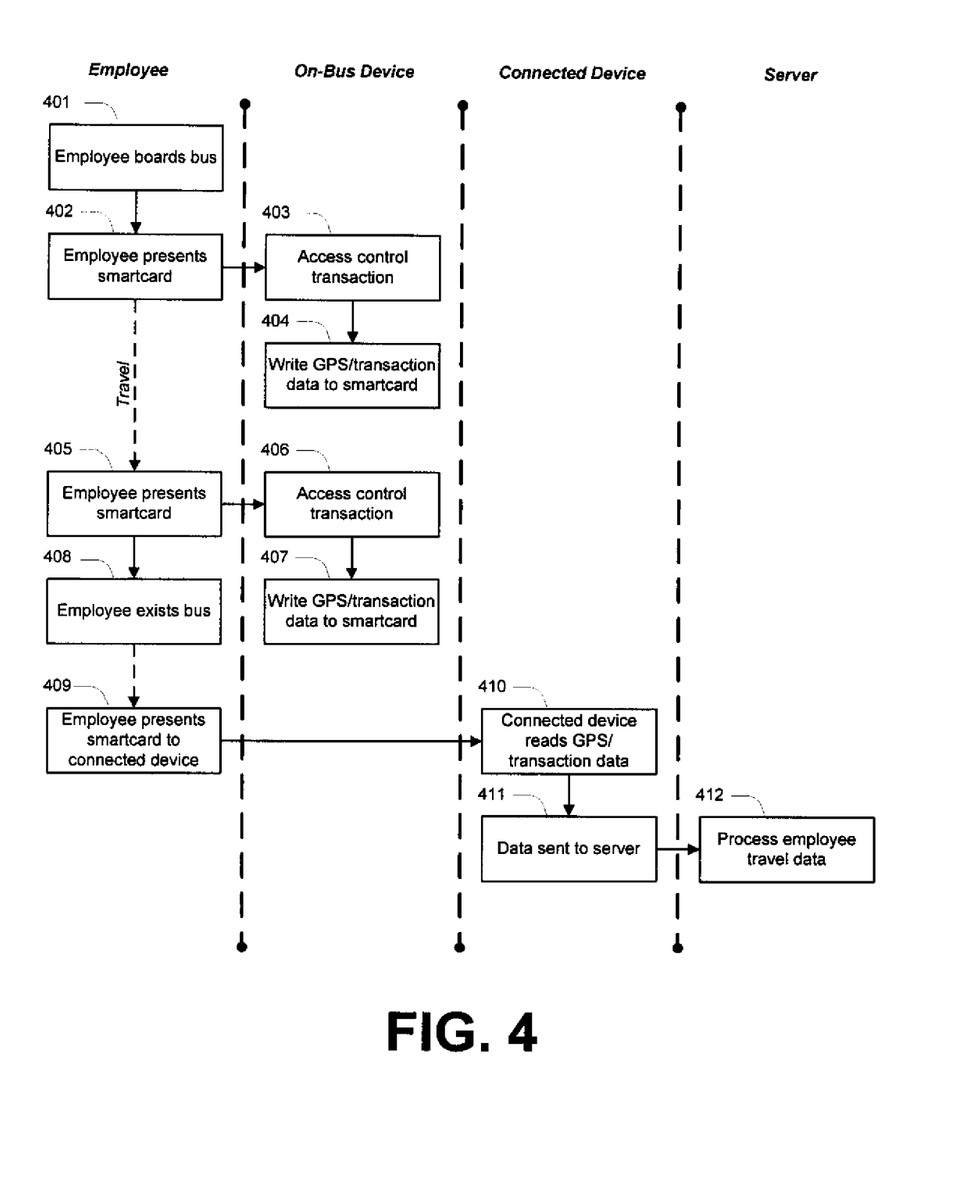
FIG. 4 illustrates a method according to one embodiment.

FIG. 4 illustrates methods preformed by an employee (being an exemplary holder of a smartcard for use in an access control environment), an access control device provided on a bus used for employee transport (being a disconnected device), a connected access control device (such as a device coupled to a security door lock/unlock actuator), and a central server that manages an access control environment including the disconnected and connected access control devices.

At step 401, the employee boards the bus. Then, at 402, the employee presents his/her smartcard to an access control device positioned on the bus. This initiates an access transaction at 403, and it is assumed for the present purposes that this transaction results in approval (meaning the employee is admitted to travel on the bus). Step 402 includes writing GPS and transaction data to the smartcard. The employee presents the card once again at 405 when preparing to exit the bus (at 408), resulting in a further access transaction at 406 and GPS/transaction data write process at 407.

In terms of the GPS/transaction data written to the smartcard at 404 and 407, in each case a portion of information is defined on the smartcard which is indicative of the access transaction and the location of the access transaction, and optionally other details such as the time, nature, card holder, and the like. The precise nature of information is dependent on data requirements of a server procedure that utilizes the data, for example in the context of monetizing employee transportation costs.

At 409, the employee presents his/her smartcard to a connected access control device belonging to the same access control environment at the on-bus access control device. That connected device reads the GPS/transaction data from the smartcard at 410, and communicates that data to the central server at 411. The connected device optionally deletes the data after it is read. The server then processes the data at 412, presently for the purposes of determining employee travel data history. For example, travel costs are optionally determined based on the distance covered by the employee (calculated based on location data for sequential access transactions).

As noted above, in some embodiments approaches other than smartcard back-propagation are used to communicate data back to a central server. In some embodiments travel data (i.e. data associating a cardholder, one or more transactions, and one or more locations) is maintained at the on-bus device until such a time as that device shifts operation to function as a connected device (for instance as discussed in the following section).

Location Aware Network Connectivity

As noted above, in some embodiments device 201 includes a wireless network interface 212 (for example am 802.11 type wireless network card or the like for connecting to a wireless LAN). The combination of this with a GPS module as presently considered is leveraged to provide for location aware network connectivity. In overview, the access control device local memory maintains geographical positional information indicative of one or more connectivity zones. The device is configured such that the wireless network interface is actuated responsive to the GPS module indicating that the device is within one or more of the connectivity zones.

The general notion is to define connectivity zones that correspond to regions where a wireless network is available, being a wireless network over which device 201 is able to communicate with the central server of the access control environment, and hence progress into a connected mode of operation. In some cases, the connectivity zone is defined by reference to GPS coordinates of a home location for the vehicle, optionally in combination with a location size parameter. In other cases GPS coordinates are used to define zones bounded by known points or the like (for example using a polygon-based mapping approach).

Using this technology, whenever a bus reaches an office or home location, the wireless on the disconnected device can be turned on automatically (based on location information preconfigured in reader) for either uploading access data to central server or downloading configuration changes from central server. This is particularly useful in reducing security risks of keeping the wireless interface open on the device throughout the duration of the journey.

Figure 5:
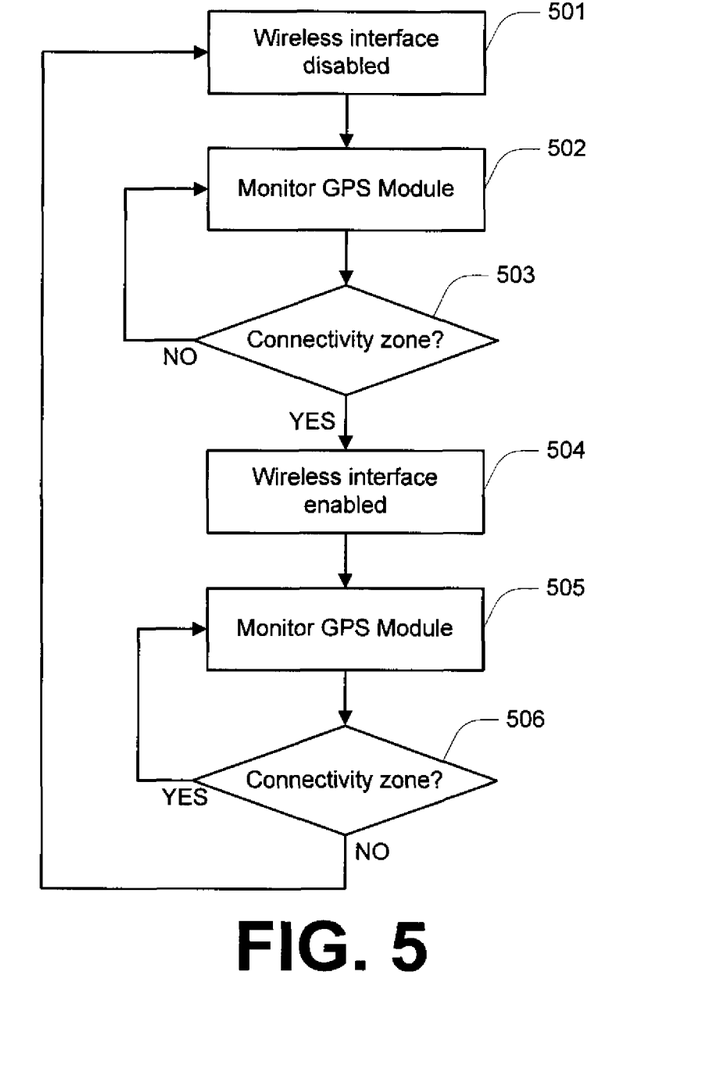
FIG. 5 illustrates a method according to one embodiment.

FIG. 5 illustrates a method for operating an access control device for location aware connectivity. It will be appreciated that modifications are readily made to this method without departing from the essence of the technology, for example by modifying the logical processes whereby the device compares stored positional data indicative of a connectivity zone with data obtained via the GPS module.

At step 501, the wireless network interface is disabled. This is somewhat of an arbitrary starting point, as the method could alternately commence at a point where the interface is enabled (see step 504). The general crux is that steps 501 and 504 respectively define states where the wireless interface is disabled and enabled. If, upon reaching one of these steps, the device is in the incorrect state, the step includes a process of activating or deactivating the network interface (whichever is appropriate in the circumstances). If, upon reaching one of these steps, the device is in the correct state, the step may include little or no activity.

Step 502 includes monitoring positional data from the GPS module, and combines with decision 503 which assesses whether the GPS module indicates that the device is within a predetermined connectivity zone. In the case that the GPS module does not indicate that the device is within a predetermined connectivity zone, the method loops to step 502. In the case that the GPS module indicates that the device is within a predetermined connectivity zone, the method progresses to 504 thereby to enable the wireless interface. A further monitoring/decision process is performed at 505 and 506. In the case that the GPS module indicates that the device is within a predetermined connectivity zone, the method loops from 506 to 505, and the wireless interface remains enabled. In the case that the GPS module does not indicate that the device is within a predetermined connectivity zone, the method loops to 501, and the wireless interface is disabled.

Various alternate approaches are optionally implemented to replace the second monitoring/decision process of 505 and 506, including time-based activation of the wireless network interface, and automated de-activation upon loss of wireless network connectivity.

Location Aware Remote Alert Functionality

As noted above, in some embodiments device 201 includes a remote communications interface 221, such as a GSM module (or other cellular communications interface) GPS-based communications interface (for example a GPSFlight module). This allows device 201 to provide messages to remote devices (for example via SMS or another messaging protocol). Interface 221 is not used to allow connected operation of device 201; even with an operable interface 221 device 201 remains in a disconnected state.

In some embodiments, interface 221 is used for providing location aware remote alert functionalities. In general terms, the device is configured to operate such that a signal is provided via the telecommunications interface responsive to an access transaction when predefined conditions are met by reference to geographical positional data. For example, a signal may be provided responsive to an access transaction involving a specified token that takes place at a specified location (or alternately at a location other than a specified location).

Location aware remote alert functionalities are described below by reference to a safety application for the transportation of students on buses (for example school buses), shown in FIG. 6. It will be appreciated that this example is provided to highlight aspects of the technology only, and that the technology is equally applicable to other real world situations.

Figure 6:
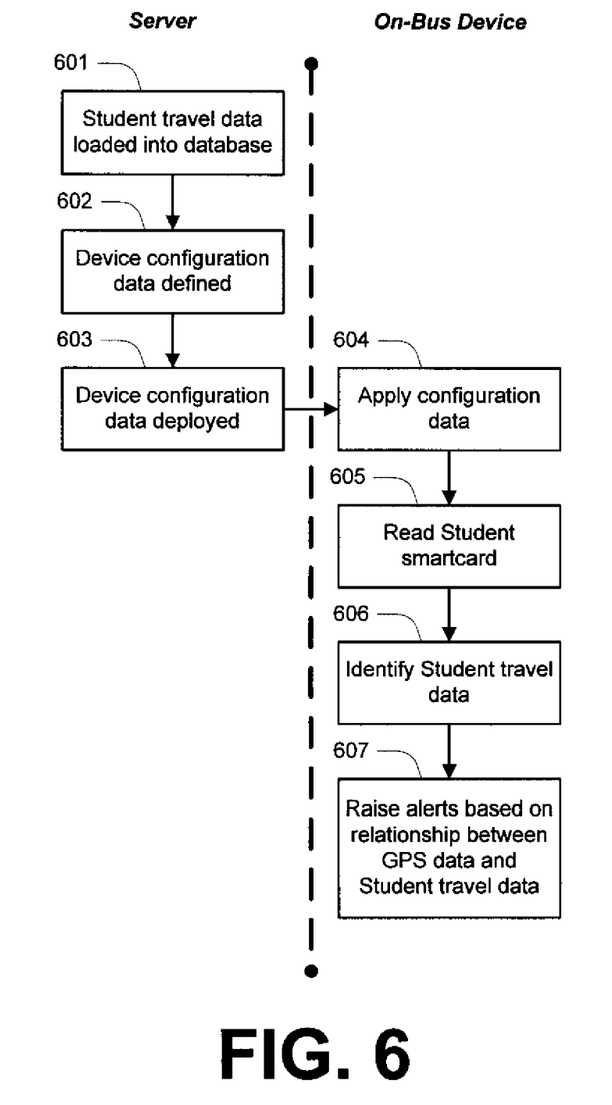
FIG. 6 illustrates a method according to one embodiment.

Referring to FIG. 6, student travel data is loaded into a database of the access control environment at 601. This travel data presently indicates, for a given student, pick up locations, drop off locations, and a parent/guardian contact number for SMS messaging. Other data may also be included.

Steps 602 and 603 respectively include defining configuration data indicative of student travel data (which may serve to update existing student travel data at a device), and deploying that data to one or more devices (connected and/or disconnected) thereby to configure those devices to function based on the travel data. The deployment of configuration data to disconnected devices may be achieved via various methods, including the use of smartcards, portable manual update devices, and the like. In other embodiments configuration data for each student is stored on the students' respective smartcards, such that a device is configured to upload a given student's travel data upon that student interacting with the device.

The configuration data is applied by an on-bus access control device at 604. At a later point in time, that device reads a student smartcard at 605 upon the student entering the bus. This essentially informs the device that a particular student is on the bus. Travel data for that student is then identified at 606, and alerts raised at 607 based on rules defined in the configuration data. For example, the alerts are raised based on a relationship between GPS data and student travel data. In some cases the alerts are SMS alerts sent to a specified addressee, such as a particular student's parent or guardian. SMS alerts of this nature are optionally provided in any one or more of the following ways:

Provide an alert when a student enters a bus at a specified location.

Provide an alert when a student exists a bus at a specified location (students swipe smartcards when existing the bus). This is useful in informing a parent or the like that a student has safely arrived at a school (for example a message stating that "your child has arrived at school").

Provide an alert when a bus carrying a student reaches a specified location. This may assist a parent in planning a time at which to collect the student from a drop-off point (for example a message estimating a time at which a student will be ready for collection from a drop-off point specified in the travel data for that student).

Alerts are also raised in the event that deviations from expected travel arrangements are observed, for example to prevent students from exiting the bus at other than a specified location, and so on.

It will be appreciated that such location based aware alerts are particularly useful in the context of monitoring the movement of cardholders in a region controlled by one or more disconnected devices, both for the purposes of monitoring safety and other issues.

Conclusions

It will be appreciated that the present disclosure provides for various systems and methods for managing access control devices (particularly disconnected devices), which are advantageous in light of what is known in the art. In particular, the use of smartcards for delivering configuration data to disconnected readers presents a time and cost effective approach, and this is further improved by the ability to obtain the relevant configuration data from any connected access control device.

Unless specifically stated otherwise, as apparent from the following discussions, it is appreciated that throughout the specification discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., an liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code.

Furthermore, a computer-readable carrier medium may form, or be includes in a computer program product.

In alternative embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagrams only show a single processor and a single memory that carries the computer-readable code, those in the art will understand that many of the components described above are included, but not explicitly shown or described in order not to obscure the inventive aspect. For example, while only a single machine is illustrated, the term "machine" or "device" shall also be taken to include any collection of machines that individually or jointly execute a set (or multiple sets) of instructions to perform any one or more of the methodologies discussed herein.

At least one embodiment of each of the methods described herein is in the form of a computer-readable carrier medium carrying a set of instructions, e.g., a computer program that are for execution on one or more processors, e.g., one or more processors that are part an information system. Thus, as will be appreciated by those skilled in the art, embodiments of the present invention may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

The software may further be transmitted or received over a network via a network interface device. While the carrier medium is shown in an exemplary embodiment to be a single medium, the term "carrier medium" should be taken to include a single medium or multiple media (e.g., a centralized or distributed database, and/or associated caches and servers) that store the one or more sets of instructions. In some cases the carrier medium is a non-transitory storage medium. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to included, but not be limited to, solid-state memories, a computer product embodied in optical and magnetic media, a medium bearing a propagated signal detectable by at least one processor of one or more processors and representing a set of instructions that when executed implement a method, a carrier wave bearing a propagated signal detectable by at least one processor of the one or more processors and representing the set of instructions a propagated signal and representing the set of instructions, and a transmission medium in a network bearing a propagated signal detectable by at least one processor of the one or more processors and representing the set of instructions.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The invention claimed is:

1. An access control device for operation in an access control system including a central server, one or more disconnected access control devices, and one or more connected access control devices, the device including:
   an interface for interacting with an access control token for the purposes of an access transaction;
   a processor and associated memory configured for processing data received from the access control token in relation to the access transaction thereby to selectively allow or deny access;
   a receiver for determining geographical positional information for the access transaction;
   wherein when the access control device is operating as a disconnected access control device, the access control device is configured to:
      in respect of a first access transaction initiated by a first access control token at a first location, write to the first access control token a first set of data indicative of geographical positional information representing the first location;
      in respect of a second access transaction initiated by the first access control token at a second location, write to the first access control token a second set of data indicative of geographical positional information representing the second location; and
   wherein the first set of data and second set of data are configured to subsequently be read from the access control token by a connected access control device, thereby to facilitate propagation of the first set of data and second set of data to the central server, such that the central server calculates transportation information for a user associated with the first access control token based upon the geographical positional information representing the first location and geographical positional information representing the second location.

2. A device according to claim 1 including a wireless network interface that is selectively actuated responsive to geographical positional information determined by the receiver.

3. A device according to claim 1 including a wireless network interface for connecting to an access control network thereby to allow the device to function as a connected access control device, wherein the memory of the device maintains geographical positional information indicative of one or more connectivity zones, and wherein the device is configured to actuate the wireless network device when the receiver indicates that the device is within one or more of the connectivity zones.

4. A device according to claim 1 including a telecommunications interface, wherein the device is configured for providing a signal via the telecommunications interface responsive to an access transaction when predefined conditions are met by reference to geographical positional data.

5. A device according to claim 1 wherein the device is located on a vehicle.

6. A method for operating an access control device, wherein the access control device is part of an access control system including a central server, one or more disconnected access control devices, and one or more connected access control devices, the method including:
  interacting with an access control token for the purposes of an access transaction;
  processing data received from the access control token in relation to the access transaction thereby to selectively allow or deny access;
  determining, based on data derived by a receiver, geographical positional information for the access transaction;
  wherein when the access control device is operating as a disconnected access control device, the access control device is configured to:
    in respect of a first access transaction initiated by a first access control token at a first location, write to the first access control token a first set of data indicative of geographical positional information representing the first location;
    in respect of a second access transaction initiated by the first access control token at a second location, write to the first access control token a second set of data indicative of geographical positional information representing the second location; and
  wherein the first set of data and second set of data are configured to subsequently be read from the access control token by a connected access control device, thereby to facilitate propagation of the first set of data and second set of data to the central server, such that the central server calculates transportation information for a user associated with the first access control token based upon the geographical positional information representing the first location and geographical positional information representing the second location.

7. A method according to claim 6 including a step of selectively actuating a wireless network interface that is responsive to geographical positional information determined by the receiver.

8. A method according to claim 6, wherein the device includes a wireless network interface for connecting to an access control network thereby to allow the device to function as a connected access control device, wherein the memory of the device maintains geographical positional information indicative of one or more connectivity zones, and wherein the method includes actuating the wireless network device when the receiver indicates that the device is within one or more of the connectivity zones.

9. A method according to claim 6 wherein the device includes a telecommunications interface, wherein the method includes providing a signal via the telecommunications interface responsive to an access transaction when predefined conditions are met by reference to geographical positional data.

10. A method according to claim 6 wherein the device is located on a vehicle.

11. An access control system including:
  a central server;
  one or more connected access control devices that are in communication with the central server via a network;
  one or more disconnected access control devices that are not in communication with the central server via the network, wherein the disconnected devices are configured to propagate information back to the central server by writing data to access control tokens presented by users;
  wherein at least one disconnected access control device includes a receiver for determining geographical positional information and is configured for writing to an access control token data indicative of the geographical positional information associated with an access transaction;
  wherein at least one of the disconnected access control devices is configured to:
    in respect of a first access transaction initiated by a first access control token at a first location, write to the first access control token a first set of data indicative of geographical positional information representing the first location;
    in respect of a second access transaction initiated by the first access control token at a second location, write to the first access control token a second set of data indicative of geographical positional information representing the second location; and
  wherein the first set of data and second set of data are configured to subsequently be read from the access control token by a connected access control device, thereby to facilitate propagation of the first set of data and second set of data to the central server, such that the central server calculates transportation information for a user associated with the first access control token based upon the geographical positional information representing the first location and geographical positional information representing the second location.

* * * * *